United States Patent [19]

Coli

[11] Patent Number: 4,651,229
[45] Date of Patent: Mar. 17, 1987

[54] ARRANGEMENT FOR GUIDING AND SHIFTING A CARRIAGE OF AN OFFICE MACHINE

[75] Inventor: Giuseppe Coli, Pavone Canavese, Italy

[73] Assignee: Ing. C. Olivetti & C., S.p.A., Ivrea, Italy

[21] Appl. No.: 787,126

[22] Filed: Oct. 15, 1985

[30] Foreign Application Priority Data

Oct. 15, 1984 [IT] Italy ................... 68014 A/84

[51] Int. Cl.$^4$ ............................................. H04N 1/10
[52] U.S. Cl. .............................. 358/285; 74/DIG. 10; 358/42; 358/293; 358/294
[58] Field of Search .................. 358/285, 293, 294, 42; 74/DIG. 10, 439, 443, 447

[56] References Cited

U.S. PATENT DOCUMENTS 2,873,340 2/1959 Bourns ........................... 74/DIG. 10
3,021,721 2/1962 Hooven ......................... 74/DIG. 10
3,534,626 10/1970 Elliott ................................... 74/439
4,268,870 5/1981 Kitamura ............................. 358/285
4,321,627 3/1982 Hooker ................................ 358/285

Primary Examiner—Howard W. Britton
Attorney, Agent, or Firm—Banner, Birch, McKie & Beckett

[57] ABSTRACT

The carriage of a digital document reader is shifted by means of a pair of worms rotatable in the frame and engaging two nuts borne by the carriage. The worms are rotated simultaneously, e.g. by a single stepping motor and a toothed belt engaging a pulley or by two separate stepping motors. For the purpose of reducing inertia, each worm is formed together with the driving pulley by molding a layer of plastics material on a metal core tube which is formed with a shallow groove of coarse pitch to anchor the plastics layer. Each nut, also of plastics material, is formed with a series of axial notches which define an equal number of elastic sectors which allow any play on the worm due to wear to be taken up.

9 Claims, 10 Drawing Figures

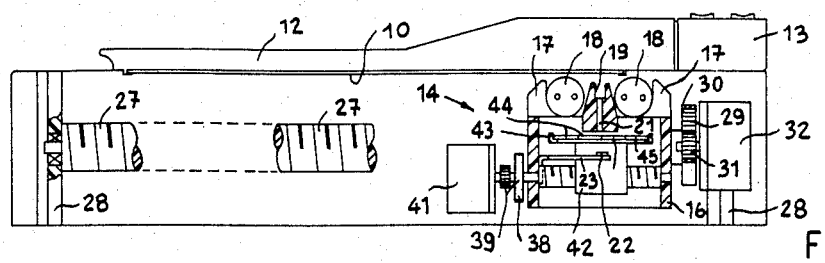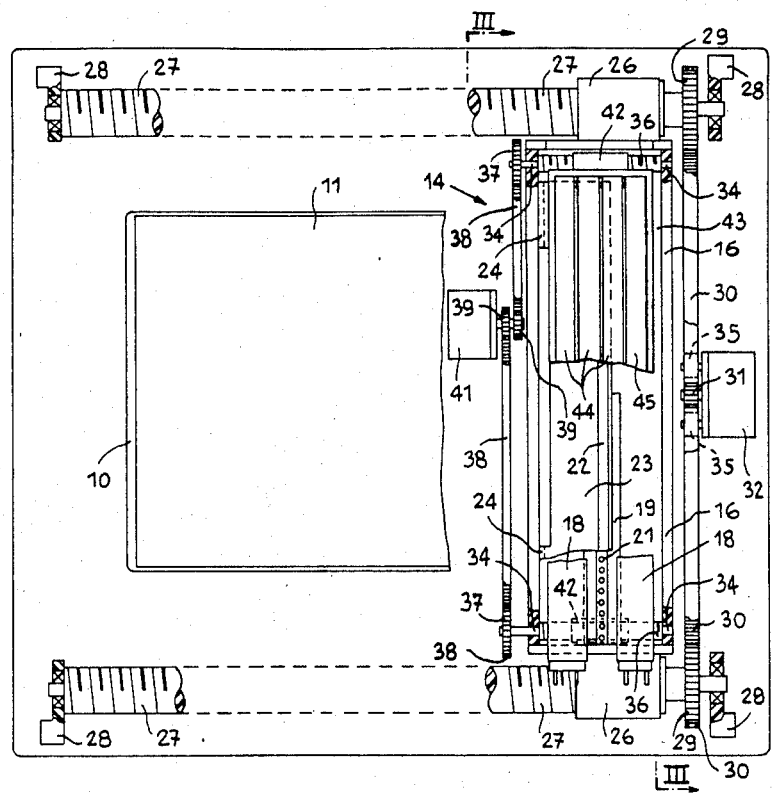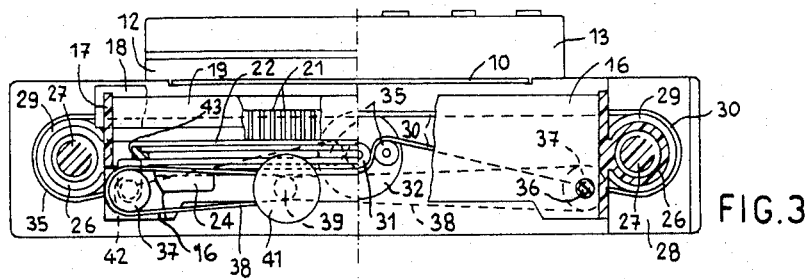

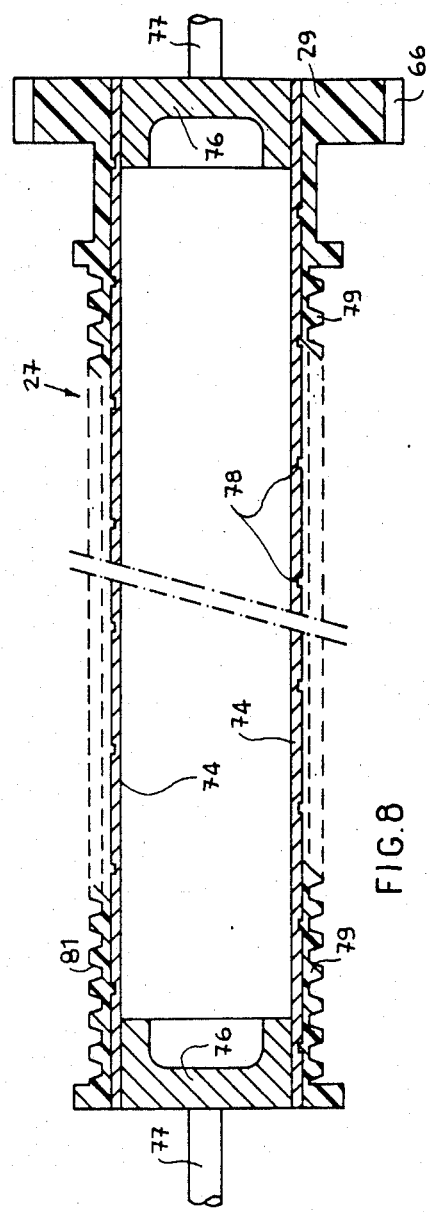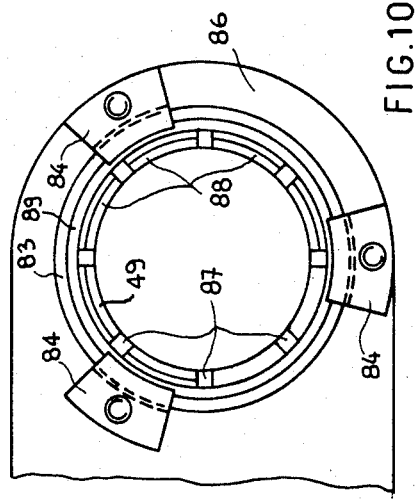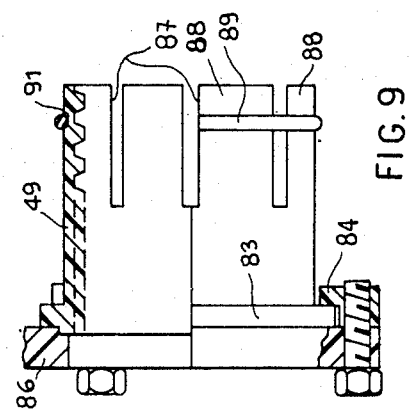

ARRANGEMENT FOR GUIDING AND SHIFTING A CARRIAGE OF AN OFFICE MACHINE

BACKGROUND OF THE INVENTION

The present invention relates to an arrangement for guiding and shifting a carriage of an office machine, for example a digital document reader or a parallel dot printer.

In office machines of the aforesaid type, the document to be read or the sheet to be printed remains still on a plate and is explored in sequence by a carriage which must shift parallel to itself step by step with great precision. Since the shift step corresponds to an elementary scanning line, this step must be all the smaller the greater the reading or printing resolution.

In known machines, such carriages are guided on prismatic guides, while advance is commanded through separate means, as a result of which, because of occasional friction and resistance, the carriage tends to skew. The carriage is moreover of complicated and costly construction.

An arrangement is already known (U.S. Pat. No. 4,268,870) in which the fixed guide of the carriage is constituted by a pair of worms parallel to one another and rotated simultaneously, which engage two nuts borne by the carriage.

Machined worms (lead screws) are expensive and it is difficult to avoid backlash. It is already know (U.S. Pat. No. 2,724,979) to construct a screw from a deformed sheet metal tube supported on a core tube. Such a screw is not suited to high precision uses. It is also known to provide a screw with self-lubricating properties by coating the threads of the screw with a plastics layer (GB 2 104 998 and DE 872 701). The latter reference also discloses an alternative in which the threads of the nut are coated with a plastics layer. In these known structures it remains necessary to machine the base thread to which the coating is applied.

SUMMARY OF THE INVENTION

The object of the present invention is to provide an arrangement of the known type described above in which the worms are manufactured simply but with sufficient precision.

The invention is characterised in that each worm is constituted by a hollow metal core on which is moulded a layer of plastics material having the shape of the worm, the metal core having a helical groove for promoting anchorage of the layer of plastics material.

The worm thread can be formed exclusively by the moulded layer of plastics material, the core being essentially a smooth-walled tube, except for the helical groove which can be a shallow groove with a coarser pitch than the worm.

BRIEF DESCRIPTION OF THE DRAWINGS

The invention will be described in more detail, by way of example, and with reference to the accompanying drawings, in which:

FIG. 1 is a diagrammatic partial longitudinal section of a first embodiment of a digital document reader incorporating a carriage shifting arrangement according to the invention;

FIG. 2 is a plan view, partly in section, of the reader of FIG. 1;

FIG. 3 is a partial cross-section on the line III—III of FIG. 2;

FIG. 8 is median section on a larger scale of a control worm for shifting the carriage;

FIG. 9 is a longitudinal section of a nut on a larger scale;

FIG. 10 is a front view of the nut of FIG. 9.

DESCRIPTION OF THE PREFERRED EMBODIMENTS

Figure 4:
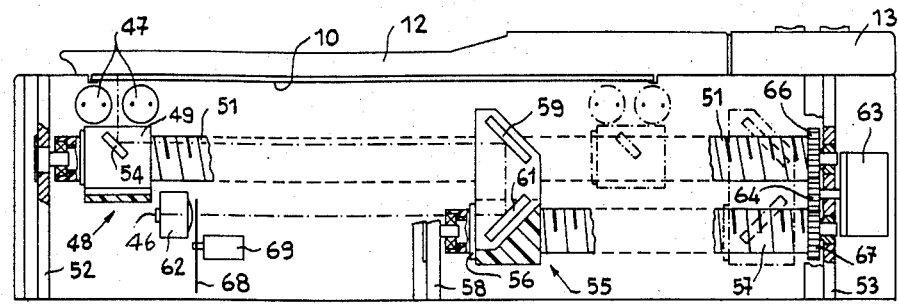
FIG. 4 is a partial longitudinal section of another embodiment of a digital reader incorporating the carriage guiding and shifting arrangement.

The invention is described hereinafter in an application to the carriage of a digital document reader,, but may be applied equally to any carriage for office machines which must be shifted rapidly with extreme precision as, for example, in parallel dot printers, that is line by line.

Referring to FIG. 1, a plane, transparent supporting surface 10 supports a document 11 to be read. The plane surface 10 is fixed and is covered by a raisable lid 12 adapted to keep the document 11 in close contact with the surface 10. Adjacent the lid 12 there is arranged a keyboard 13 for controlling the digital reader. This is provided with a carriage 14 which comprises a frame 16 of plastics material extending so as to cover the width of the document 11 to be read (FIG. 2).

The frame 16 has at both ends two seats 17 (see also FIG. 3) for a pair of flurorescent lamps 18 for illuminating the document 11. Moreover, the frame 16 has a transverse seat 19 (FIG. 1) in which is inserted a bar 21 of optical fibres which are spaced apart according to the width of the elementary areas, i.e. pixels, to be read on the document 11. The number of pixels per mm, generally between 3 and 12, indicates the resolving power of the reader. The bar 21 constitutes the objective of the reader and conveys the light rays reflected from the pixels to an amorphous silicon sensor 22 (FIG. 2) known per se, which is carried by a plate 23 fixed to two brackets 24 of the frame 16.

The frame 16 is fast at both lateral ends with two nuts 26 and constitutes with them the carriage of the machine, which bears the lamps 18, the objective 21 and the sensor 22. The nuts 26 engage with two worms 27 which are parallel to one another and rotatable in two pairs of supports 28 fixed to the frame of the machine. Two toothed wheels 29 in engagement with a toothed belt 30 are fixed on the two worms 27. This belt is moreover guided by two belt stretchers 35 and is engaged by a pinion 31 (FIG. 3) which is rotated by an electric stepping motor 32. Thus the motor 32 causes the two worms 27 to rotate simultaneously and these moreover constitute the fixed guides of the carriage.

To allow the reading of colour images, the frame 16 bears two pairs of seats 34 (FIG. 2) in which there are rotatably mounted two worms 36 which are fast with two toothed wheels 37 in engagement with two corresponding toothed belts 38. These are in engagement with two pinions 39 which are rotated by a second stepping motor 41 which thus causes the two worms 36 to rotate simultaneously. The two worms 36 are in engagement with two nuts 42 fast with a frame 43, with which they form an auxiliary carriage. This bears three colour filters 44 adapted to be disposed selectively between the objective 21 and the sensor 22. A fourth position 45 of the frame 43 is without a filter and interposed in front of the objective. At each step of the motor 32, the carriage 14 brings the objective 21 into correspondence with an elementary line of the sheet. At the end of the scanning of the document, the motor 41 causes the auxiliary carriage 42, 43 to shift so as to interpose the next filter 44 in correspondence with the obejctive 21, so that the document 11 is read three times by interposing the three filters 44 in succession.

According to another embodiment of the invention, in which a sensor 46 of the CCD type (FIG. 4) is used, the original 11 is illuminated by two fluorescent lamps 47 borne by a first carriage 48. This carries two nuts 49 (FIG. 5) in engagement with two worms 51 extending over the entire length of the reader and rotatable in two pairs of supports 52 and 53 of the fixed frame of the reader. The carriage 48 moreover carries a mirror 54 (FIG. 4) inclined at 45° so as to reflect the image of the elementary line of the document 11 in a plane parallel to the document itself, as indicated by the chain-dotted line in FIG. 4. The reader moreover comprises a second carriage 55 which is also provided with two nuts 56 (FIG. 5) in engagement with two worms 57 disposed between the worms 51 and rotatable in the pair of supports 53 and in another pair of supports 58. The carriage 55 bears a pair of mirrors 59 and 61 (FIG. 4) inclined at 45° in opposite directions so as to bend the optical path back through 180° towards the objective 62.

Figure 5:
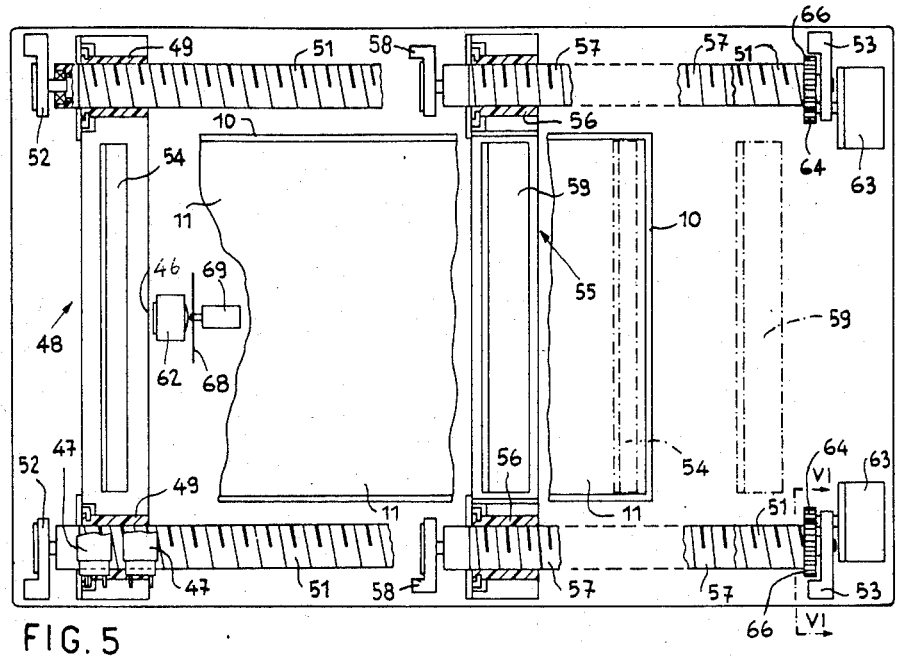
FIG. 5 is a partial plan view, partly in section, of the reader of FIG. 4.

Since, as is known, the distance between the line read on the document 11 and the objective 62 must be constant, the carriage 55 must shift by a travel which is one half of that of the carriage 48, for which reason the length of the worms 57 is substantially one half of that of the worms 51 and the supports 58 are disposed about halfway along the length of the reader. In FIGS. 4 and 5, the end-of-travel positions of the two carriages 48 and 55 are indicated by chain-dotted lines.

Figure 6:
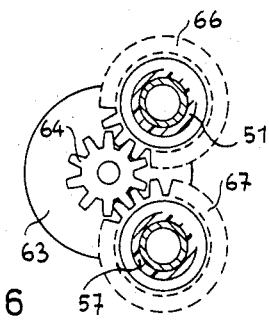
FIG. 6 is a partial section on the line VI—VI of FIG. 5 on a larger scale.

The two pairs of worms 51 and 57 are rotated by a pair of stepping motors 63, each of which drives a worm 51 and a worm 57 on the same side of the carriages 48 and 55. More particularly, each motor 63 is provided with a pinion 64 which engages simultaneously a toothed wheel 66 (FIG. 6) fast with the corresponding worm 51 and a toothed wheel 67 fast with the corresponding worm 57. The toothed wheels 66 and 67 have the same diameter and the different speeds of the carriages 48 and 55 (FIG. 4) are obtained by making the worm-and-nut pair 51, 49 with a pitch one half of that of the pair 57, 56. Obviously, in order to scan the document 11 line by line, the two motors 63 are rotated each time simultaneously by an equal number of steps corresponding to the distance between two elementary lines. It is therefore clear that the worms 51 and 57 constitute the fixed guides of the respective carriages 48 and 55.

For reading a document 11 with colour images, there is used here a disc 68 disposed in front of the objective 62 and bearing four sectors, three for the coloured filters and one for reading in black and white. The disc 68 is rotated swiftly by another stepping motor 69 for reading each elementary line of the document, so that the three colours are read line by line.

Figure 7:
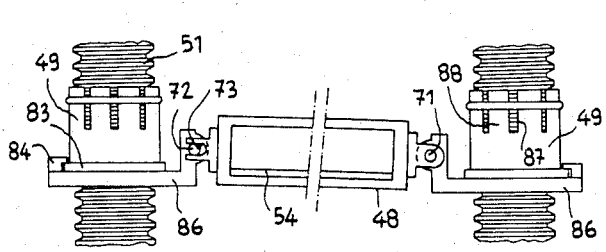
FIG. 7 is a diagram of a detail of a modification of FIG. 5.

For the purpose of allowing alignment of the carriage 48 with the document 11 to be read, for example in the event of the document 11 being printed with images slightly rotated with respect to the edge of the document, instead of the carriage 48 being fast with the two nuts 49 it is connected to one of these by means of an articulation 71 (FIG. 7) and to the other by a joint comprising a pin 72 and a slot 73. A similar connection is provided for the carriage 55 and the nuts 56. By now making one of the two stepping motors 63 rotate suitably, while the other remains stationary, the orientation of the carriage 48 can be varied within certain limits to align it with the line of the image. The carriage 55 is turned in consequence, to maintain unchanged the ratio of the distance from the objective 62 with respect to the carriage 48 along the entire width of the carriages themselves.

Each of the worms 27, 36 (FIG. 1), 51, 57 (FIG. 3) must have a low inertia, a suitable rigidity and indeformability and characteristics appropriate for damping vibrations, in order to ensure the rapidity and precision of the movements of the respective carriage. Moreover, each worm must present a high resistance to wear and a low coefficient of friction.

According to the invention, these characteristics are obtained by forming each worm with a core constituted by a metal tube 74 (FIG. 8), for example of aluminium with a thickness of about 2 mm, which is closed at the ends by two discs 76, also of metal, each bearing a steel pin or pivot 77. For simplicity, the structure of the worm 27 is indicated in FIG. 8; that of the other worms 36, 51 and 57, however is completely like that indicated in FIG. 8. On the outer surface of the core 74 there is formed a helical groove 78 with a pitch of 10:15 mm.

Thereupon, on the core 74 there is deposited, in a single moulding operation, a layer of plastics material 79, for example, nylon, PTFE or polyethylene, which is shaped so as to present an external thread 81 with the pitch required for the transmission of the motion from the respective motor to the carrige. The layer 79 may have a minimum thickness of 2 to 3 mm in the groove of the thread and remains anchored to the core 74 by the action of the grooves 78.

By the same moulding operation, the toothed driving pulley 29 can be formed on one end Obviously, in the case of the worms 51 and 57, instead of the toothed pulley 29, the toothed wheels 66 and 67, respectively will be formed.

The nut 49 (FIGS. 7, 9 and 10) can also be obtained by moulding with the same material as the layer 79 of the worm. The nut 49 may be provided with a flange 83 by means of which it can be subsequently fixed, for example by means of three blocks 84, to a ring 86 connected to the corresponding carriage.

For the purposes of allowing the wear which occurs in the thread of the nut and the worm to be taken up, the nut is moulded with a series of axial notches 87 extending from the end opposite the flange 83 for about one half of its length. The notches 87 create in this way a series of sectors 88 which are held in position by an elastic element, for example an elastic ring 89 inserted in an annular groove 91 in the sectors 88 themselves.

Among various possible modifications, in the embodiment of FIGS. 1 to 3, the two pairs of worms 27 and 36 may be actuated by the two pairs of motors, each pair actuated in synchronism. In the embodiment of FIGS. 4 and 5, the two pairs of worms 51 and 57 may also be actuated by two pairs of motors which allow independent adjustment, for the two carraiges 48 and 55, of small misalignments with the document 11. Finally, the two pairs of worms 51 and 57 may be actuated by a single motor through the medium of a toothed belt.

Moreover, the worms 27, 36, 51, 57 can be obtained by using various expedients to allow the core 74 (FIG. 8) to stand the high pressures of injection of the plastics layer 79.

I claim:

1. An arrangement for guiding and shifting a carriage (14) of an office machine, wherein the fixed guide of the carriage is constituted by a pair of worms (27) parallel to one another and rotated simultaneously, which engage two nuts (26) borne by the carriage, characterised in that each worm is constituted by a hollow metal core (74) on which is molded a layer (79) of plastics material having the shape of the worm, the metal core (74) having a helical groove (78) for promoting anchorage of the layer of plastics material.

2. An arrangement according to claim 1, characterised in that each nut (26) is formed of plastics material which is sufficiently elastic and the pitch of the worms being such as to allow the taking up of any play on the worm, the nut being formed with a series of axial notches (87) to define a series of elastic sectors (88), the sectors being held in close contact with the worm (79) by an elastic ring (89).

3. An arrangement according to claim 1, characterised by a stepping motor (32) connected to the two worms through a toothed belt (30) in engagement with two pulleys (29) fixed on the two worms (27).

4. An arrangement according to claim 1, characterised in that the worms (51) are rotated by two corresponding stepping motors (63) which are individually controllable, the carriage (48) being articulated (71–73) to the nuts (49) to allow adjustment of the angular position of the carriage with respect to the worms.

5. An arrangement according to claim 1, for a digital document reader, wherein the reader is adapted to read in sequence a plurality of primary colours of the pixels of a line, by means of reading elements (22) of the amorphous silicon type borne by the carriage (14), characterised by a second carriage (43) bearing a series of filters (44) and adapted to be shifted with respect to the first carriage (14) to interpose the filters in sequence between the reading elements (22) and the document.

6. An arrangement according to claim 1, characterised in that the worms (27) are moulded unitarily with a driving gear (66) by a single operation of moulding the plastics material (79) on the metal core (74).

7. An arrangement according to claim 1, for a digital document reader, in which the carriage bears a series of elements (46) for reading in parallel the pixels of an elementary line of a document, and comprising a second carriage (55) movable parallel to the first carriage (48), characterised in that the second carriage (55) is guided and shifted by a second pair of worms (57) each formed in a similar way to the first pair of worms (51).

8. An arrangement according to claim 7, wherein the reading elements (46) are of the CCD type, characterised in that each motor (63) rotates through two like gears (66, 67) a worm (51) of the first carriage (48) and a worm (57) of the second carriage (55), the worms of the second carriage having a pitch such as to cause the second carriage to shift at a predetermined speed with respect to the first carriage, the second carriage (55) bearing a device (59, 61) for reflecting the image read by the reading elements (46).

9. An arrangement according to claim 8, characterised in that a series of filters for reading colour images in disposed between the reflecting device (59, 61) and the reading elements (46), the filters being borne by a disc (68) rotated selectively on the reading of each elementary line of the document.

* * * * *